US009822286B2

(12) United States Patent
Fornof et al.

(10) Patent No.: US 9,822,286 B2
(45) Date of Patent: Nov. 21, 2017

(54) SELF-WETTING ADHESIVE COMPOSITION

(71) Applicant: 3M INNOVATIVE PROPERTIES COMPANY, St. Paul, MN (US)

(72) Inventors: Ann R. Fornof, St. Paul, MN (US); James P. DiZio, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/787,021

(22) PCT Filed: Jun. 10, 2014

(86) PCT No.: PCT/US2014/041693
§ 371 (c)(1),
(2) Date: Oct. 26, 2015

(87) PCT Pub. No.: WO2014/209599
PCT Pub. Date: Dec. 31, 2014

(65) Prior Publication Data
US 2016/0096982 A1  Apr. 7, 2016

Related U.S. Application Data

(60) Provisional application No. 61/838,468, filed on Jun. 24, 2013.

(51) Int. Cl.
*C09J 4/06* (2006.01)
*C09J 135/02* (2006.01)
*C09D 4/06* (2006.01)
C08F 220/18 (2006.01)
C08F 222/10 (2006.01)
C08F 230/08 (2006.01)
C08K 5/00 (2006.01)

(52) U.S. Cl.
CPC .............. *C09J 135/02* (2013.01); *C09D 4/06* (2013.01); *C09J 4/06* (2013.01); C08F 2220/1858 (2013.01); C08F 2222/1013 (2013.01); C08F 2230/085 (2013.01); C08K 5/0025 (2013.01)

(58) Field of Classification Search
CPC .................................. C09J 135/02; C09J 4/06
See application file for complete search history.

(56) References Cited

U.S. PATENT DOCUMENTS

| 3,290,203 A | 12/1966 | Antonson |
| 3,681,179 A | 8/1972 | Theissen |
| 4,095,013 A | 6/1978 | Burger |
| 4,329,396 A | 5/1982 | Kropp |
| 4,503,169 A | 3/1985 | Randklev |
| 5,227,185 A | 7/1993 | Gobran |
| 5,360,659 A | 11/1994 | Arends |
| 5,879,759 A | 3/1999 | Zang |
| 5,905,099 A | 5/1999 | Everaerts |
| 6,040,061 A | 3/2000 | Bland |
| 6,565,992 B1 | 5/2003 | Manners |
| 6,783,850 B2 * | 8/2004 | Takizawa ........... C08G 18/6254 428/355 AC |
| 6,811,867 B1 | 11/2004 | McGurran |
| 7,090,721 B2 | 8/2006 | Craig |
| 7,090,722 B2 | 8/2006 | Budd |
| 7,156,911 B2 | 1/2007 | Kangas |
| 7,368,161 B2 | 5/2008 | McGurran |
| 7,649,029 B2 | 1/2010 | Kolb |
| 7,906,202 B2 | 3/2011 | Padiyath |
| 8,137,807 B2 | 3/2012 | Clapper |
| 8,247,509 B2 * | 8/2012 | Okamoto ............... C09J 7/0217 427/208.4 |
| 2006/0154049 A1 | 7/2006 | Padiyath |
| 2011/0253301 A1 * | 10/2011 | Yamanaka ................ B32B 7/12 156/247 |
| 2013/0288052 A1 * | 10/2013 | Tapio .................... C09J 7/0207 428/355 CN |

FOREIGN PATENT DOCUMENTS

| EP | 355962 | 2/1990 |
| EP | 2674467 | 12/2013 |
| KR | 2011-0068436 | 6/2011 |
| WO | WO 2009-085662 | 7/2009 |
| WO | WO 2010-132176 | 11/2010 |
| WO | WO 2011-059939 | 5/2011 |
| WO | 2012/061296 | * 5/2012 |

OTHER PUBLICATIONS

Paul, "How Thermodynamics Drives Wet-out in Adhesive Bonding: Correcting Common Misconceptions", Journal of Adhesion Science and Technology, 2008, vol. 22, No. 1, pp. 31-45.
International Search Report for PCT International Application No. PCT/US2014/041693, dated Aug. 21, 2014, 3pgs.

* cited by examiner

Primary Examiner — Margaret Moore
(74) Attorney, Agent, or Firm — Kent S. Kokko

(57) ABSTRACT

A self-wetting adhesive composition is described comprising the reaction product of a low $T_g$ (meth)acrylate solute copolymer component; a low $T_g$ solvent monomer solvent monomer component comprising low $T_g$ monomers, a multifunctional acrylate; and a polymerizable siloxane copolymer having at least one polydiorganosiloxane segment and at least on oxyalkylene segment.

19 Claims, No Drawings

SELF-WETTING ADHESIVE COMPOSITION

CROSS REFERENCE TO RELATED APPLICATIONS

This application is a national stage filing under 35 U.S.C. 371 of PCT/US2014/041693, filed Jun. 10, 2014, which claims priority to U.S. Application No. 61/838,468, filed Jun. 24, 2013, the disclosure of which is incorporated by reference in its/their entirety herein.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, adhesives are known to possess properties including the following: (1) adherence with no more than finger pressure, (2) sufficient ability to hold onto an adherend, and (3) sufficient cohesive strength to be removed cleanly from the adherend. Materials that have been found to function well as ADHESIVEs include polymers designed and formulated to exhibit the requisite viscoelastic properties resulting in a desired balance of tack, peel adhesion, and shear holding power. These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize an adhesive.

SUMMARY

The present disclosure provides novel adhesive compositions comprising a highly crosslinked low $T_g$ (meth)acrylic (co)polymer and a siloxane copolymer having at least one polydiorganosiloxane segment and at least on oxyalkylene segment ("siloxane copolymer").

The adhesives of this disclosure provide the desired balance of tack, peel adhesion, and shear holding power, and further conform to the Dahlquist criteria; i.e. the modulus of the adhesive at the application temperature, typically room temperature, is less than $3\times10^6$ dynes/cm at a frequency of 1 Hz. The adhesives of the present disclosure are particularly useful for forming strong bonds to low surface energy (LSE) substrates, and further exhibit exceptional adhesion at elevated temperatures on these substrates.

The cured adhesive composition, when cured, exhibit low peel strength and are self-wetting. By "self-wetting" is meant that the cured adhesive formulation exhibits spontaneous wetting out on a smooth surface to which it is applied with little or no external pressure. An additional characteristic of a self-wetting adhesive formulation is that the cured adhesive is removable with little or no residue remaining on the surface to which it had been applied. The initial 180° peel strength of the cured formulation is less than about 5 N/dm and in some cases less than about 1 N/dm.

The adhesive compositions, when cured, is non-yellowing, exhibits low shrinkage, low birefringence and low sensitivity to moisture (cloud point-resistant), making it suitable for many optical applications including, but not limited to bonding polarizers to modules of a liquid crystal display (LCD) and attaching various optical films to a glass lens in, for example, mobile hand held (MHH) devices.

In some embodiments the adhesives adhere, yet remain repeatedly peelable from a variety of smooth substrates such as glass, metal, wood, paper with matte or glossy finish surfaces or polymer substrates over a long period of time without damaging the substrate or leaving any adhesive residue or stain on the surface. Adhesive articles are provided comprising a flexible backing such as, for example, a biaxially-oriented polyethylene terephthalate.

Ideally, depending on the substrate, the removable adhesive must provide wettability to the substrate and quick initial adhesion (sufficient initial tack or quick stick) to quickly fix the adhesive to the desired substrate. On the other hand, the adhesive should exhibit only a low and at any rate acceptable adhesion buildup with time, even at elevated temperatures, to ensure clean peelability after a prolonged dwell. The adhesive should furthermore be characterized by an adequate peel strength to give a reliable, high performance adhesion to the substrate without damaging the substrate when removing the adhesive. The adhesives exhibit sufficient cohesive and tensile strength and hence form and dimensional stability of the adhesive article to allow proper handling and, in particular, the reapplication of the article to substrate after having peeled it off once or several times. A sufficient cohesive strength is also desirable in order to limit the cold flow of the adhesive on a surface, a process which leads to an undesirable build-up of peel strength over time. The static shear strength should be high enough to allow light-duty mounting applications without being too high to result in permanent adhesion. In some embodiments the adhesive should furthermore exhibit a high resistivity against water in order to allow outdoor applications. Furthermore, a high resistance against organic solvents is desirable.

In some embodiments the adhesive are transparent for visible light in order to allow for an essentially invisible mounting of objects on transparent substrates such as glass or transparent polymers. The present disclose provides an optically clear adhesive article that includes an optically clear and the cured optical adhesive composition disposed on a major surface of the substrate. This disclosure further provides and optical clear article comprise a first and second optical clear substrate, and the cured adhesive disposed between the two substrates. The articles of the disclosure may have a thickness greater than about 0.03 millimeters, generally a birefringence (absolute) of less than $1\times10^{-6}$, light transmission greater than about 85% (over the spectral region of interest), preferably greater than 90%, more preferably greater than 95%, and a CIELAB b* less than about 1.5 units, preferably less than about 1.0 unit for samples with adhesive thickness of 500 microns.

Exemplary formulations can also easily be removed, so that when used for screen protection for example, a film covering can be removed, should a consumer desire to do so or if other circumstances warrant, without damaging the screen or leaving behind a residue. Exemplary formulations also exhibit a low peel strength upon curing resulting an adhesive that is easily removable.

DETAILED DESCRIPTION

The adhesive compositions of this disclosure comprise, in part, a low $T_g$ copolymer component, comprising a low $T_g$ monomer and optional acid-functional monomer. The $T_g$ of the copolymer is ≤0° C., preferably ≤−20° C., most preferably ≤−50° C.

The (meth)acrylate ester monomer useful in preparing the low $T_g$ (meth)acrylate (co)polymer is a monomeric (meth) acrylic ester of a non-tertiary alcohol, which alcohol contains from 1 to 18 carbon atoms and preferably an average of from 4 to 12 carbon atoms. A mixture of such monomers may be used.

Examples of monomers suitable for use as the (meth) acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable.

In some embodiments, the preferred (meth)acrylate ester monomer is the ester of (meth)acrylic acid with an alcohol derived from a renewable source, such as 2-octanol, citronellol, dihydrocitronellol.

In some embodiments a portion of the above described (meth)acrylate esters may be substituted with (meth)acrylates derived from 2-alkyl alkanols (Guerbet alcohols) as described in U.S. Pat. No. 8,137,807 (Lewandowski et al.), incorporated herein by reference.

The low $T_g$ (meth)acrylate ester monomer is present in an amount of 90 to 100 parts, preferably 95 to 100 parts by weight based on 100 parts total monomer content used to prepare the low $T_g$ copolymer. Preferably (meth)acrylate ester monomer is present in an amount of 95 to 99 parts by weight based on 100 parts total monomer content of the low $T_g$ copolymer.

The polymer may further comprise an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer, when present, is generally used in amounts of 0.5 to 5 parts by weight, based on 100 parts by weight total monomer of the low $T_g$ copolymer.

In addition to the low $T_g$ monomer and acid functional monomer, the copolymer may optional include other monomers, such as non-acid functional polar monomers, vinyl monomers and vinyl ether monomers, provided the resultant copolymers has a Tg of <0° C., maintains the compatibility with the siloxane copolymer, and has the requisite optical and adhesive properties. Such additional monomers may be used in amounts of up to 5 parts by weight, relative to 100 parts by weight of total monomers.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy) ethyl (meth)acrylate, 2-ethoxyethyl (meth)acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone.

A useful predictor of interpolymer $T_g$ for specific combinations of various monomers can be computed by application of Fox Equation: $1/T_g = \Sigma W_i/T_g i$. In this equation, $T_g$ is the glass transition temperature of the mixture, Wi is the weight fraction of component i in the mixture, and $T_g i$ is the glass transition temperature of component i, and all glass transition temperatures are calculated in Kelvin (K). As used herein the term "low $T_g$ monomer" refers to a monomer, which when homopolymerized, produce a (meth)acrylate copolymer having a $T_g$ of ≤20° C., preferably ≤0° C., more preferably ≤−20° C., as calculated using the Fox Equation. Alternatively, the glass transition temperature can be measured in a variety of known ways, including, e.g., through differential scanning calorimetry (DSC).

In order to provide sufficient cohesive strength of the adhesive composition, a multifunctional (meth)acrylate is incorporated into the blend of polymerizable monomers. A multifunctional (meth)acrylate, when used in the amounts described herein provide an adhesive having low tack, high shear modulus, low peel, and facilitates the self-wetting property. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition.

Typically, the multifunctional (meth)acrylate is present in amounts greater than 5 parts based on 100 parts of the low $T_g$ solute copolymer and solvent monomer component. More specifically, the multifunctional (meth)acrylate may be present in amounts from 5 to 50 parts, preferably at least 10 parts, based on 100 parts of the low $T_g$ solute copolymer and solvent monomer component.

The curable composition further comprises a free radically polymerizable segmented siloxane-based copolymer. A wide range of free radically polymerizable segmented siloxane-based copolymers are suitable for this application. Typically, the free radically polymerizable segmented siloxane-based copolymer comprises a segmented siloxane-based copolymer with at least one free radically polymerizable (meth)acrylate group.

One suitable class of free radically polymerizable segmented siloxane-based copolymers are so called "silicone-polyether" block copolymer-based free radically polymerizable copolymers. These copolymers typically have at least one siloxane block (i.e. with diorgano including dialkyl or diaryl siloxane (—SiR$^1_2$O—) repeating units), and at least one polyether or (poly)oxyalkylene block. Frequently the silicone-polyether block copolymer-based free radically polymerizable copolymers have at least two free radically polymerizable groups. Some silicone-polyether block copolymer-based free radically polymerizable copolymers have more than two free radically polymerizable groups.

The block copolymers may be linear having a general structure of the type:

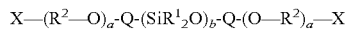

where X is H is a free radically polymerizable group (including vinyl, allyl and preferably a (meth)acrylate group; $R^2$ is an alkylene group and typically is an ethylene group (—CH$_2$—CH$_2$—); Q is difunctional linking group, typically an alkylene group such as a propylene group (—CH$_2$—CH$_2$—CH$_2$—); $R^1$ is alkyl or aryl group, typically a methyl group; and a and b are independently integers greater than 1, with the proviso that at least one X is a free radically polymerizable group.

Other block copolymers have pendent structures of the general type:

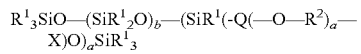

where $R^1$ is alkyl or aryl group, typically a methyl group; X is a free radically polymerizable group as described above; $R^2$ is an alkylene group and typically is an ethylene group (—CH$_2$—CH$_2$—); Q is a difunctional linking group, typically an alkylene group such as a propylene group (—CH$_2$—CH$_2$—CH$_2$—); and a and b are independently integers greater than 1.

Some useful free radically polymerizable segmented siloxane-based copolymers are silicone additives that are commercially available as "slip agents". It was unexpected that agents that are marketed as slip agents would improve the self-wetting performance and that could free-radically polymerized into the adhesive (co)polymer chain. Examples of silicone additives that are useful free radically polymerizable segmented siloxane-based copolymers include: those from Momentive Performance Materials, Columbus, Ohio, under the trade name "COAT-O-SIL" such as COAT-O-SIL 3503 and COAT-O-SIL 3509; those from Cytec Industries, Inc., Woodland Park, N.J., under the trade name "EBECRYL" such as EBECRYL 350 and EBECRYL 1360; and TEGORAD 2200N commercially available from Evonik Industries, AG, Essen, Germany.

The amount of siloxane copolymer used depends on the materials comprising the substrates and polymeric film, as well as their dimensions. Generally, the amount of siloxane copolymer used is greater than 5 parts by weight, relative to 100 parts by weight of the solute (co)polymer and solvent monomers (the syrup polymer composition), or relative to cured acrylic copolymer. Preferably the amount of siloxane copolymer is from 5 to 50 parts by weight relative to 100 parts by weight of the syrup polymer composition, or relative to cured acrylic copolymer to provide useful bonding times and faster wet-out of a substrate.

The curable composition is preferably prepared by a syrup polymerization technique. "Syrup polymer composition" refers to a solution of a solute (co)polymer in one or more solvent monomers, the composition having a viscosity of from 500 to 10,000 cPs at 22° C. Here, a monomer mixture consisting of the (meth) acrylate monomer, the optional acid functional monomer and other monomers are combined and partially polymerized using a thermal- or photoinitiator. The resulting syrup polymer, comprising a solute (meth)acrylate copolymer and unreacted solvent monomers, is then combined with the multiacrylate crosslinking agent and photoinitiator. If desired, additional solvent monomers and initiators may be added after the initial partial polymerization In the presence of a photoinitiator, subsequent treatment with UV radiation will simultaneously polymerize the solvent monomers and crosslink the composition with the multiacrylate.

Any conventional free radical initiator may be used to generate the initial polymerization to form the syrup polymer composition. Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO™67 (2,2'-azo-bis(2-methylbutyronitrile)) VAZO™64 (2,2'-azo-bis(isobutyronitrile)) and VAZO™52 (2,2'-azo-bis(2,2-dimethyvaleronitrile)), and Lucidol™70 from Elf Atochem North America, Philadelphia, Pa.

The solute (co)polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup polymer. While an acceptable method, this procedure involving a highly converted functional polymer is not preferred because an additional solvent removal step is required, another material may be required (the non-monomeric solvent), and dissolution of the high molecular weight, highly converted solute polymer in the monomer mixture may require a significant period of time. Additional solvent monomers may be added to the syrup polymer composition to reduce the viscosity as desired.

A preferred method of preparation of the coatable syrup polymer is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals.

The monomer mixture is generally partially polymerized (converted) to produce a the syrup copolymer comprising up to 30 parts by weight of the solute copolymer in solvent monomers and has a viscosity of from 500 to 10,000 cPs at 22° C. After partial conversion, the multifunctional acrylate, the siloxane copolymer and optional additional monomers are added and the syrup polymer composition further polymerized, preferably by photopolymerization using a photoinitiator.

Useful photoinitiators include benzoin ethers such as benzoin methyl ether and benzoin isopropyl ether; substituted acetophenones such as 2,2-dimethoxyacetophenone, available as Irgacure™651 photoinitiator (Ciba Specialty Chemicals), or as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. Additional photoinitiator can be added to the mixture to be coated after the copolymer has been formed, i.e., photoinitiator can be added to the syrup polymer mixture.

The syrup polymer composition and the photoinitiator may be irradiated with activating UV radiation to polymerize the monomer component(s). UV light sources can be of two types: 1) relatively low light intensity sources such as backlights which provide generally 10 mW/cm$^2$ or less (as measured in accordance with procedures approved by the United States National Institute of Standards and Technology as, for example, with a Uvimap™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. Where actinic radiation is used to fully or partially polymerize the syrup polymer composition, high intensities and short exposure times are preferred. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$. Such photoinitiators preferably are present in an amount of from 0.1 to 1.0 pbw per 100 pbw of the syrup polymer composition.

The degree of conversion (of monomers to copolymer) can be monitored during the irradiation by measuring the index of refraction of the polymerizing. Useful coating viscosities are achieved with conversions (i.e. the percentage of available monomer polymerized) in the range of up to 30%, preferably 2-20%, more preferably from 5-15%, and most preferably from 7-12%. The molecular weight (weight average) of the solute polymer(s) is at least 100,000, preferably at least 250,000, more preferably at least 500,000.

It will be understood that a syrup polymerization method will produce a "dead polymer" in the initial free radical polymerization; i.e. a fully polymerized, not free-radically polymerizable polymer. Subsequently the solvent monomers do not free-radically polymerize onto the extant solute copolymer. Upon compounding the syrup polymer, further exposure to UV initiates free radical polymerization of the solvent monomers and multiacrylate crosslinking agent to produce a distinct crosslinked copolymer. Upon curing, the product may be characterized as a homogenous mixture of a) a low $T_g$ (co)polymer (from the initial polymerization, b) a highly crosslinked low $T_g$ (co)polymer (from the subsequent polymerization of the monomer and multiacrylate component and c) the siloxane copolymer.

The syrup method provides advantages over solvent or solution polymerization methods; the syrup method yielding higher molecular weights. These higher molecular weights increase the amount of chain entanglements, thus increasing cohesive strength.

The syrup polymer composition may comprise:
a) 5 to 40 parts, preferably 10 to 40 parts by weight of a low $T_g$ (meth)acrylate solute (co)polymer component;
b) 60 to 95, preferably 60 to 90, parts by weight of a low $T_g$ solvent monomer solvent monomer component comprising low $T_g$ monomers and a multifunctional acrylate, the sum of a) and b) being 100 parts by weight;
c) 5 to 50 parts by weight a plasticizer, relative to 100 parts a) and b).

The thermal and photoinitiators can be employed in concentrations ranging from about 0.0001 to about 3.0 pbw, preferably from about 0.001 to about 1.0 pbw, and more preferably from about 0.005 to about 0.5 pbw, per 100 pbw of the monomers.

The adhesive may be prepared by the steps of
1) free radically polymerizing a mixture of the low $T_g$ monomer and optional acid-functional and other monomers monomer to produce a syrup polymer composition such that the conversion of monomers to polymer is up to about 30%,
2) adding the multifunctional acrylate crosslinking agent, siloxane copolymer, optional additional monomers and photoinitiator to the syrup polymer composition, and
3) further polymerizing the mixture, preferably by photopolymerization.

If desired, the syrup polymer composition may be coated on a substrate prior to further polymerization.

In some embodiments the charge of additional monomers in step 2) is desirable. Such additional monomers may further reduce the viscosity of the syrup polymer. Further, it has been found desirable to add the acid functional monomers and/or non-acid functional polar monomers in step) to avoid peel adhesion build on substrates. If a second charge of additional monomers is used, up to 70 parts by weight, preferably up to 50 parts by weight of monomers may be reserved from the initial monomer charge for the second monomer charge in step 2). Thus the initial monomer charge may comprise 30 parts or less in the initial charge, the mixture is partially polymerized to a syrup polymer composition, and then up to 70 parts of additional monomers are added in the second charge.

Those skilled in the art will also know that other additives such as fillers, antioxidants, stabilizers, and colorants may be blended with the adhesive for beneficial properties.

In some embodiments the composition may include filler. In many embodiments the filler is of a type and used in amounts such that incorporation does not deleterious affect the optical and adhesive properties of the adhesive. In some embodiments, small amounts of filler may be used to improve the cohesive strength of the adhesive.

Such compositions may include at least 1 wt-%, more preferably at least 5 wt-%, and most preferably at least 10 wt-% filler, based on the total weight of the syrup polymer composition. In some embodiments the total amount of filler is at most 50 wt-%, preferably at most 40 wt-%, and more preferably at most 30 wt-% filler.

Fillers may be selected from one or more of a wide variety of materials, as known in the art, and include organic and inorganic filler. Inorganic filler particles include silica, submicron silica, zirconia, submicron zirconia, and non-vitreous microparticles of the type described in U.S. Pat. No. 4,503,169 (Randklev).

Filler components include nanosized silica particles, nanosized metal oxide particles, and combinations thereof. Nanofillers are also described in U.S. Pat. No. 7,090,721 (Craig et al.), U.S. Pat. No. 7,090,722 (Budd et al.), U.S. Pat. No. 7,156,911 (Kangas et al.), and U.S. Pat. No. 7,649,029 (Kolb et al.).

In some embodiments, the composition preferably comprise a nanoparticle filler having an average primary particle size of less than about 100 nanometers, preferably less than 50 nanometers, and more preferably less than 10 nanometers. As used herein, the term "primary particle size" refers to the size of a non-associated single particle. The typically has an average primary particle size of at least about 1 nanometers (nm), and preferably at least about 5 nm. The average surface area of such a filler is preferably at least about 20 square meters per gram ($m^2/g$), more preferably, at least about 50 $m^2/g$, and most preferably, at least about 100 $m^2/g$.

In some embodiments, a surface modified filler can be used. The surface modifying agents for the fillers may enhance dispersibility or rheological properties. Examples of silanes of this type include, for example, aryl polyethers, alkyl, hydroxy alkyl, hydroxy aryl, or amino alkyl functional silanes.

In many embodiments, a preferred filler is hydrophobic fumed silica, such as Aerosil™ R972 fumed silica from Degussa.

The resulting adhesives are self wetting and removable. The adhesives exhibit great conformability permitting them to spontaneously wet out substrates. The surface characteristics also permit the adhesives to be bonded and removed from the substrate repeatedly for repositioning or reworking. The strong cohesive strength of the adhesives gives them structural integrity limiting cold flow and giving elevated temperature resistance in addition to permanent removability. In some embodiments the initial removability of an adhesive coated article bonded to a glass substrate, as measured by the 180° Peel Adhesion test described in the Examples section below, is no greater than 5 Newtons/decimeter. Upon aging for one week at room temperature the removability, as measured by the 180° Peel Adhesion test is no more than 10 Newtons/decimeter. In other embodiments, the removability after aging for at least one week at room temperature, as measured by the 180° Peel Adhesion is no more than 5 N/dm.

Adhesive articles may be prepared by coating the adhesive or pre-adhesive composition on a suitable support, such as a flexible backing Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spun-bond poly(ethylene) and poly(propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

The backing may also be formed of metal, metalized polymer films, or ceramic sheet materials may take the form of any article conventionally known to be utilized with pressure sensitive adhesive compositions such as labels, tapes, signs, covers, marking indicia, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

In some preferred embodiments, the partially cured composition, i.e. the solute (co)polymer, unreacted monomers, multiacrylate crosslinking agent and siloxane copolymer is coated on a backing or release liner, and then further polymerized.

The substrate is selected depending on the particular application in which it is to be used. For example, the adhesive can be applied to sheeting products, (e.g., decorative graphics and reflective products), label stock, and tape backings Additionally, the adhesive may be applied directly onto a substrate such as an automotive panel, or a glass window so that another substrate or object can be attached to the panel or window.

The adhesive can also be provided in the form of an adhesive transfer tape in which at least one layer of the adhesive is disposed on a release liner for application to a permanent substrate at a later time. The adhesive can also be provided as a single coated or double coated tape in which the adhesive is disposed on a permanent backing.

Exemplary adhesive articles in which the self wetting and removability features are especially important include, for example: large format articles such as graphic articles and protective films; and information display devices.

Large-format graphic articles or protective films typically include a thin polymeric film backed by an adhesive. These articles may be difficult to handle and apply onto a surface of a substrate. The large format article may be applied onto the surface of a substrate by what is sometimes called a "wet" application process. The wet application process involves spraying a liquid, typically a water/surfactant solution, onto the adhesive side of the large format article, and optionally onto the substrate surface. The liquid temporarily "detackifies" the adhesive so the installer may handle, slide, and re-position the large format article into a desired position on the substrate surface. The liquid also allows the installer to pull the large format article apart if it sticks to itself or prematurely adheres to the surface of the substrate. Applying a liquid to the adhesive may also improve the appearance of the installed large format article by providing a smooth, bubble free appearance with good adhesion build on the surface of the substrate.

Examples of a large format protective films include window films such as solar control films, shatter protection films, decoration films and the like. In some instances the film may be a multilayer film such as a multilayer IR film (i.e., an infrared reflecting film), such as a microlayer film having selective transmissivity such as an optically clear but infrared reflecting film as described in U.S. Pat. No. 5,360,659 (Arends et al.).

While the wet application process has been used successfully in many instances, it is a time consuming and messy process. A "dry" application process is generally desirable for installing large format graphic articles. Adhesives that are self wetting and removable may be applied with a dry installation process. The articles are easily attached to a large substrate because they are self wetting and yet they may be easily removed and repositioned as needed.

In other applications, such as information display devices, the wet application process cannot be used. Examples of information display devices include devices with a wide range of display area configurations including liquid crystal displays, plasma displays, front and rear projection displays, cathode ray tubes and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, bumper stickers, etc) reflective sheeting and the like.

A wide variety of information display devices are in use, both illuminated devices and non-illuminated devices. Many of these devices utilize adhesive articles, such as adhesive coated films, as part of their construction. One adhesive article frequently used in information display devices is a protective film. Such films are frequently used on information display devices that are frequently handled or have exposed viewing surfaces.

In some embodiments, the adhesives of this disclosure may be used to attach such films to information display devices because the adhesives have the properties of optical clarity, self wetting and removability. The adhesive property of optical clarity permits the information to be viewed through the adhesive without interference. The features of self wetting and removability permit the film to be easily applied to display surface, removed and reworked if needed during assembly and also removed and replaced during the working life of the information display device.

The articles of the disclosure may have a thickness greater than about 0.03 millimeters, generally a birefringence (absolute) of less than $1 \times 10^{-6}$, light transmission greater than about 85% (over the spectral region of interest), preferably greater than 90%, more preferably greater than 95%, and a CIELAB b* less than about 1.5 units, preferably less than about 1.0 unit for samples with adhesive thickness of 500 microns. Further, the adhesive layer of these articles permeably have optical properties at least equal to those of the article.

Generally, the optical properties of the adhesive layer per se is measured indirectly by measuring the optical properties of the article (substrate coated with adhesive) and the substrate alone. The optical properties, such as transmissivity are generally reported as an average over the spectral region of interest; UV, visible and IR. Therefore, the adhesives of this disclosure have a birefringence (absolute) of less than $1 \times 10^{-6}$, light transmission greater than about 85% (over the spectral region of interest), preferably greater than 90%, more preferably greater than 95%, and a CIELAB b* less than about 1.5 units, preferably less than about 1.0 unit, over the spectral regions of interest.

In some embodiments this disclosure provides solar control articles that may be applied to windows to reduce the transmissivity over the spectral region of interest including UV, visible and IR. The solar control articles comprise a solar control film and a layer of the adhesive of this disclosure on a major surface thereof.

Solar control films are known and include dyed and vacuum-coated polymeric films reduce the transmissivity of various spectral region from the incident light, i.e. sunlight. To reduce heat load from incident light, solar transmission is blocked in either the visible or the infrared portions of the solar spectrum (i.e., at wavelengths ranging from 400 nm to 2500 nm or greater.) Primarily through absorption, dyed films can control the transmission of visible light and consequently provides glare reduction. However, dyed films generally do not block near-infrared solar energy and consequently are not completely effective as solar control films. Other known window films are fabricated using vacuum-deposited grey metals, such as stainless steel, inconel, monel, chrome, or nichrome alloys. The deposited grey metal films offer about the same degrees of transmission in the visible and infrared portions of the solar spectrum. The grey metal films are relatively stable when exposed to light, oxygen, and/or moisture, and in those cases in which the transmission of the coatings increases due to oxidation, color changes are generally not detectable. After application to clear glass, grey metals block light transmission by approximately equal amounts of solar reflection and absorption. Vacuum-deposited layers such as silver, aluminum, and copper control solar radiation primarily by reflection and are useful only in a limited number of applications due to the high level of visible reflectance. A modest degree of selectivity (i.e., higher visible transmission than infrared transmission) is afforded by certain reflective materials, such as copper and silver.

More recently, solar control films based on multilayer optical films (MLOF) have been developed which comprise hundreds or even thousands of film layers and optional nanoparticles, and which selectively transmit or reflect based on small differences in the refractive indices of adjacent film layers and reflectance or absorbance of the nanoparticles. The film layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For optical films designed to reflect light at ultraviolet, visible, or near-infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

One such solar control multilayer film is described in US2006154049 (Weber et al., incorporated herein by reference) which describes a multilayer film article including an infrared light reflecting multilayer film having alternating layers of a first polymer type and a second polymer type, an infrared light absorbing nanoparticle layer including a plurality of metal oxide nanoparticles dispersed in a cured polymeric binder and having a thickness in a range from 1 to 20 micrometers. The nanoparticle layer being disposed adjacent the multilayer film.

Other useful solar control films include those described in EP 355962 (Gilbert), U.S. Pat. No. 3,290,203 (Antonson et al.), U.S. Pat. No. 3,681,179 (Theissen), U.S. Pat. No. 4,095,013 (Burger), U.S. Pat. No. 6,565,992 (Ouderkirk et al.), U.S. Pat. No. 5,227,185 (Gobran), U.S. Pat. No. 4,329, 396 (Arriban et al.), U.S. Pat. No. 7,368,161 (McGurran et al.), U.S. Pat. No. 6,811,867 (McGurran et al.), U.S. Pat. No. 7,906,202 (Padiyath et al.) and U.S. Pat. No. 6,040,061 (Bland et al.), incorporated herein by reference.

EXAMPLES

Materials. Commercial reagents were used as received. When not specified, reagents were obtained from Sigma Aldrich.

2-OA-2-octyl acrylate
HDDA—hexanediol diacrylate
IOA—isooctyl acrylate

Coatosil—Coatosil™ 3509 (an acrylated silicone polyether copolymer from Momentive, Columbus, Ohio)

Test Methods

180° Peel Adhesion Test (Peel)

A test sample was prepared by placing a 0.5 (12.2 cm) inch wide by 7 inch (178 cm) long adhesive coated tape on a 100 cm by 250 cm glass or stainless steel plates, as specified in the examples. The plates were cleaned by wiping with isopropanol before testing. The tape was rolled down onto the panel with two passes of a 2 kg roller. The samples were aged against the glass for 10 min at 23° C. or 24 h at 23° C. or in an oven at 85° C. for 24 h. The test was conducted on a slip/peel tester (Instrumentors Inc.; Strongsville, Ohio). The tape was removed from the plate at a peel angle of 180° and a platen speed of 90 inches per minute (2.288 m/min) for a total of 2 seconds. The force required to remove the tape was measured in grams per 0.5 inch and converted to Newtons/decimeter (N/dm). Results are the average of three tests on each adhesive and shown in Tables 1 and 2.

Wet Out Test

A glass slide with dimensions of 3 inch×1 inch was held at an angle of 69° and dropped on the self-wetting adhesive surface. The time to wet out the glass slide was recorded in seconds and divided by the area wet out (i.e. 3 in$^2$ for the glass slide). The test was performed three times for each sample, and the average was reported as shown in Tables 1 and 2.

Examples 1-21

A syrup was prepared for examples 1-21 by adding 200 g, 1.08 mol of 2-octyl acrylate (2-OA, provided by 3M Company, St. Paul, Minn.) and 0.32 wt % Irgacure 651 (BASF, Florham Park, N.J.) in a clear quart jar and sparged with nitrogen for 15 minutes. The sample was then irradiated with ultraviolet light (Sylvania Blacklight 350 nm) for 30 seconds to partially polymerize the composition to a syrup polymer. Upon completion of the irradiation, the syrup polymer was bubbled with oxygen to stop the polymerization for 30 seconds. The material was magnetically stirred until a homogenous mixture was achieved. From this syrup polymer material, 20 g aliquots were taken and placed in amber jars. HDDA, Coatosil 3509 and Irgacure 651 were added to the 20 g aliquots in amounts shown in Table 1. The material was rolled until a homogenous mixture was achieved.

Examples 21-42

The same procedure was used to prepare examples 21-42 except that isooctyl acrylate was used rather than 2-octyl acrylate in the syrup. The formulations are shown in Table 2.

Coating of Self-Wetting Adhesives

After rolling, the syrup polymer compositions were knife coated onto the non-primed side of a primed PET film (Mitsubishi Hostaphan™ 3SAB Polyester Film, Mitsubishi Polyester Film Inc.; Greer, S.C.). The coated adhesives were then cured by UVA light (~350 mJ/cm$^2$) and UVC light (~70 mJ/cm$^2$). The cured adhesive had a thickness of about 2 mil (~50 micrometers).

TABLE 1

2-OA-based Formulations

| Ex | HDDA (wt %) | Coatosil 3509 (wt %) | Wet Out (s/in$^2$) | Peel (N/dm) 10 min, 23° C. | Peel (N/dm) 24 h, 23° C. | Peel (N/dm) 24 h, 85° C. |
|---|---|---|---|---|---|---|
| 1 | 1.96 | 0.00 | 6.8 | 3.79 | 7.59 | 15.18 |
| 2 | 1.95 | 0.49 | 6.0 | 2.78 | 5.56 | 11.12 |
| 3 | 1.94 | 0.97 | 5.8 | 2.74 | 5.48 | 10.96 |
| 4 | 1.87 | 4.67 | 4.0 | 1.61 | 3.22 | 6.45 |
| 5 | 1.79 | 8.93 | 4.6 | 1.07 | — | — |
| 6 | 1.71 | 12.82 | 4.4 | 0.55 | — | — |
| 7 | 1.64 | 16.39 | 4.6 | 1.45 | — | — |
| 8 | 4.76 | 0.00 | 8.5 | 1.29 | 1.76 | 1.12 |
| 9 | 4.74 | 0.47 | 3.9 | 1.26 | 1.04 | 1.27 |
| 10 | 4.72 | 0.94 | 4.5 | 0.92 | 1.11 | 1.37 |
| 11 | 4.55 | 4.55 | 2.8 | 0.59 | — | 0.59 |
| 12 | 4.35 | 8.70 | 3.0 | — | — | — |
| 13 | 4.17 | 12.50 | 2.9 | — | — | — |
| 14 | 4.00 | 16.00 | 8.1 | — | — | — |
| 15 | 9.09 | 0.00 | 5.7 | 0.90 | 1.04 | 0.82 |
| 16 | 9.05 | 0.45 | 5.6 | 0.89 | 1.29 | 0.99 |
| 17 | 9.01 | 0.90 | 5.4 | 0.87 | 1.63 | 0.96 |
| 18 | 8.70 | 4.35 | 4.2 | 0.68 | 0.77 | 1.44 |
| 19 | 8.33 | 8.33 | 11.1 | — | — | — |
| 20 | 8.00 | 12.00 | 11.5 | — | — | — |
| 21 | 7.69 | 15.38 | 6.1 | — | — | — |

TABLE 2

IOA-based formulations

| Ex | HDDA (wt %) | Coatosil 3509 (wt %) | Wet Out (s/in2) | Peel (N/dm) 10 min, 23° C. | Peel (N/dm) 24 h, 23° C. | Peel (N/dm) 24 h, 85° C. |
|---|---|---|---|---|---|---|
| 22 | 2 | 0 | 6.4 | 2.97 | 2.87 | 2.46 |
| 23 | 1.95 | 0.49 | 4.6 | 1.74 | 1.40 | 1.94 |
| 24 | 1.94 | 0.97 | 3.8 | 1.63 | 1.23 | 1.93 |
| 25 | 1.87 | 4.67 | 3.3 | 1.08 | 0.61 | 1.60 |
| 26 | 1.79 | 8.93 | 3.0 | 0.67 | 0.32 | 1.38 |
| 27 | 1.71 | 12.82 | 2.9 | 0.47 | 0.13 | 1.07 |
| 28 | 1.64 | 16.39 | 3.8 | 0.37 | 0.16 | 0.91 |
| 29 | 4.76 | 0.00 | 4.1 | 1.15 | 1.10 | 0.96 |
| 30 | 4.74 | 0.47 | 4.0 | 0.82 | 0.64 | 0.84 |
| 31 | 4.72 | 0.94 | 5.3 | 0.74 | 0.54 | 0.86 |
| 32 | 4.55 | 4.55 | 3.4 | 0.59 | 0.25 | 0.90 |
| 33 | 4.35 | 8.70 | 3.2 | 0.44 | 0.25 | 0.78 |
| 34 | 4.17 | 12.50 | 2.8 | 0.29 | 0.08 | 0.68 |
| 35 | 4.00 | 16.00 | 3.3 | — | — | — |
| 36 | 9.09 | 0.00 | 5.0 | 0.66 | 0.76 | 0.66 |
| 37 | 9.05 | 0.45 | 4.7 | 0.56 | 0.38 | 0.64 |
| 38 | 9.01 | 0.90 | 6.0 | 0.45 | 0.47 | 0.63 |
| 39 | 8.70 | 4.35 | 3.9 | 0.47 | 0.25 | 0.53 |
| 40 | 8.33 | 8.33 | 3.3 | — | — | — |
| 41 | 8.00 | 12.00 | 2.8 | — | — | — |
| 42 | 7.69 | 15.38 | 2.7 | — | — | — |

What is claimed is:

1. A syrup polymer composition comprising:
   a) 5 to 40 parts by weight of a low $T_g$ (meth)acrylate solute copolymer component having a $T_g \leq 0°$ C.;
   b) 60 to 95 parts by weight of a low $T_g$ solvent monomer component comprising low $T_g$ monomers having a $T_g \leq 0°$ C., and a multifunctional acrylate;
   the sum of a) and b) being 100 parts by weight;
   c) 5 to 50 parts by weight, relative to 100 parts a) and b) of a segmented siloxane copolymer having at least one polydiorganosiloxane segment and at least one oxyalkylene segment.

2. The syrup polymer composition of claim 1 wherein the composition comprises 5 to 20 parts of the siloxane copolymer, relative to 100 parts of a) and b).

3. The syrup polymer composition of claim 1 wherein the solute copolymer comprises:
a) 95-100 parts by weight of low $T_g$ monomer units;
b) 0 to 5 parts of acid-functional monomer units;
c) 0 to 5 parts of a non-acid functional polar monomer the sum being 100 parts by weight.

4. The syrup polymer composition of claim 1 wherein the solvent monomer component comprises:
a) 60 to 90 parts by weight of low $T_g$ monomers;
b) 0 to 5 parts of acid functional monomers;
c) 10 to 40 parts of a multiacrylate;
the sum being 100 parts by weight.

5. The syrup polymer composition of claim 1 comprising 20 to 50 parts of a siloxane copolymer, relative to 100 parts a) and b).

6. The syrup polymer composition of claim 1 wherein the solute low $T_g$ copolymer comprises 1 to 5 parts by weight of acid-functional monomer units and 5 to 95 parts by weight of low $T_g$ monomer units.

7. The syrup polymer composition of claim 1 wherein the solute low $T_g$ copolymer comprises 1 to 5 parts by weight of non-acid-functional monomer units.

8. The syrup polymer composition of claim 1 wherein the solvent monomer component comprises 1 to 5 parts by weight of acid-functional monomer units.

9. The syrup polymer composition of claim 1 wherein the solute low $T_g$ copolymer comprises 100 parts by weight of low $T_g$ monomer units.

10. The syrup polymer composition of claim 1 wherein the segmented siloxane copolymer comprises at least two (meth)acrylate groups.

11. The syrup polymer composition of claim 1 wherein the segmented siloxane copolymer is of the formula:

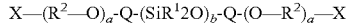

where X is H or a free radically polymerizable group;
$R^2$ is an alkylene group;
Q is difunctional linking group;
$R^1$ is alkyl or aryl group; and
a and b are independently integers greater than 1, with the proviso that at least one X is a free radically polymerizable group.

12. The syrup polymer composition of claim 1 wherein the segmented siloxane copolymer is of the formula:

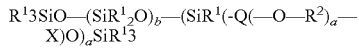

where $R^1$ is alkyl or aryl group;
X is a free radically polymerizable group;
$R^2$ is an alkylene group;
Q is a difunctional linking group; and
a and b are independently integers greater than 1.

13. An adhesive comprising the cured syrup polymer composition of claim 1.

14. A method of making an adhesive comprising the steps of:
partially polymerizing a low $T_g$ monomer and optional acid functional monomer to a viscosity produce a syrup polymer composition, adding a multifunctional acrylate crosslinker agent, optional additional monomers, and a segmented siloxane copolymer having at least one polydiorganosiloxane segment and at least on oxyalkylene segment, and further photopolymerizing.

15. The method of claim 14, wherein the syrup copolymer comprises up to 30 parts by weight of the solute copolymer in solvent monomers.

16. The method of claim 14 comprising the steps of partially polymerizing a low $T_g$ monomer and other optional monomers to produce a syrup polymer composition of claim 1, adding a multifunctional acrylate crosslinker agent, additional monomers, and plasticizer, and further photopolymerizing.

17. The method of claim 14 wherein up to 20 parts of additional monomers are added relative to 100 parts total monomers.

18. An adhesive article comprising a substrate and a coating of the cured composition of claim 1 on a surface thereof.

19. An adhesive comprising
a) 10 to 40 parts by weight of a low $T_g$ (meth)acrylate solute copolymer component;
b) 60 to 90 parts by weight of a crosslinked low $T_g$ solvent copolymer component; and
c) 5 to 50 parts by weight of a segmented siloxane copolymer having at least one polydiorganosiloxane segment and at least one oxyalkylene segment, relative to a) and b).

* * * * *